(12) United States Patent
Kroub

(10) Patent No.: US 7,837,069 B2
(45) Date of Patent: Nov. 23, 2010

(54) DROPPER FOR USE AT NIGHT OR IN OTHER LOW-LIGHT CONDITIONS

(76) Inventor: Melissa Helen Kroub, 1983 E. 8$^{th}$ St., Brooklyn, NY (US) 11223

( * ) Notice: Subject to any disclaimer, the term of this patent is extended or adjusted under 35 U.S.C. 154(b) by 682 days.

(21) Appl. No.: 11/535,918

(22) Filed: Sep. 27, 2006

(65) Prior Publication Data

US 2007/0080168 A1    Apr. 12, 2007

Related U.S. Application Data

(60) Provisional application No. 60/721,563, filed on Sep. 27, 2005.

(51) Int. Cl.
*A61J 1/05*      (2006.01)
*A61F 9/00*      (2006.01)
*B65D 47/20*   (2006.01)

(52) U.S. Cl. .............. 222/113; 222/420; 604/295; 422/934; 141/24

(58) Field of Classification Search ............ 222/113, 222/209, 420; 604/295; 422/934; 141/24
See application file for complete search history.

(56) References Cited

U.S. PATENT DOCUMENTS

| | | | | |
|---|---|---|---|---|
| 2,307,745 A | * | 1/1943 | Lutz et al. | 73/442 |
| RE29,047 E | * | 11/1976 | Brindley | 362/205 |
| 4,515,295 A | * | 5/1985 | Dougherty | 222/113 |
| 5,558,653 A | * | 9/1996 | Lindstrom | 604/295 |
| 5,678,729 A | * | 10/1997 | Raymond | 222/23 |
| 2002/0016576 A1 | * | 2/2002 | Lee | 604/300 |
| 2004/0173642 A1 | * | 9/2004 | Clifford et al. | 222/420 |

* cited by examiner

*Primary Examiner*—Kenneth Bomberg
(74) *Attorney, Agent, or Firm*—Greenberg Traurig, LLP

(57) ABSTRACT

Various embodiments of the present invention are directed to droppers that can be used at nighttime or in low-light conditions.

2 Claims, 1 Drawing Sheet

DROPPER FOR USE AT NIGHT OR IN OTHER LOW-LIGHT CONDITIONS

CROSS-REFERENCE TO RELATED APPLICATIONS

Figure 1:
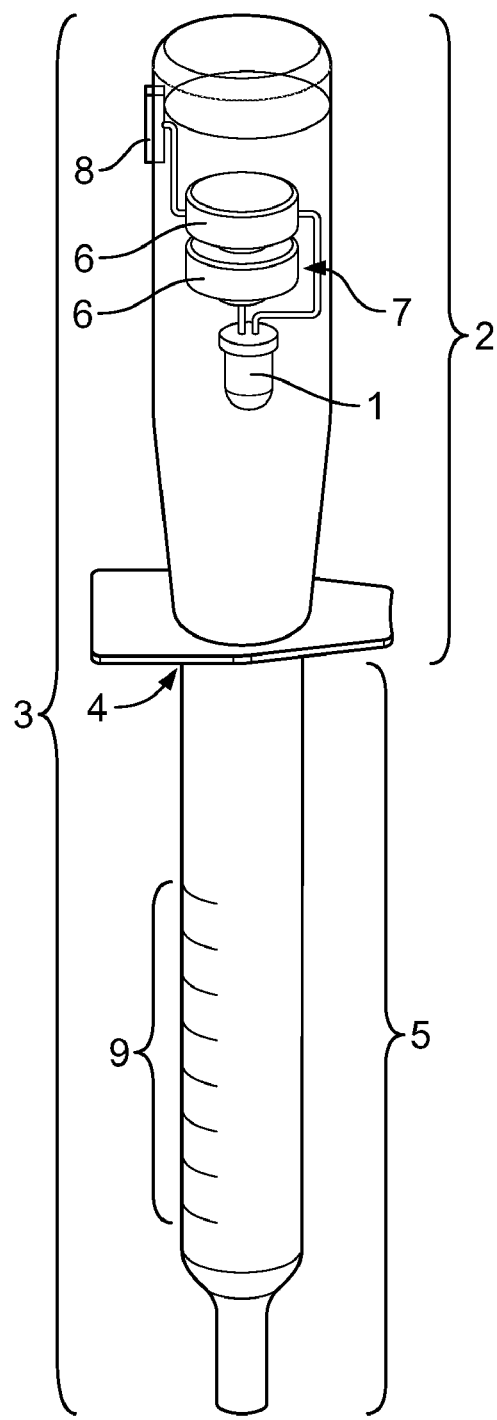

This application claims priority under 35 U.S.C. §119(e) from Provisional Application No. 60/721,563, filed with the United States Patent and Trademark Office on Sep. 27, 2005.

FIELD OF THE INVENTION

Various embodiments of the present invention are directed to droppers.

More particularly, one embodiment of the present invention is directed to a dropper with one or more of the following attributes: able to take in and dispense liquids by drops, containing a bulb for manual control of the intake and dispensing of liquids by drops, able to provide an indication of how much liquid is in the dropper, having a coating that illuminates in night or other low-light conditions so that the amount of liquid in the dropper is visible, and built to meet applicable industry standards.

FIG. 1 shows an apparatus according to an embodiment of the present invention.

A light source 1 is housed within the top portion 2 of an apparatus 3. The top portion 2 of the apparatus 3 is, in one embodiment, sealably connected 4 to a dropper portion or tube 5 of the apparatus 3. A power source 6 is incorporated within the apparatus 3 and provides power to a light source 1 optionally connected to a timer 7. The apparatus includes an activation mechanism 8 for turning on the light source 1, and the dropper portion 5 of the apparatus 3 may further include a coating or other markings 9 able to provide an indication of how much liquid is in the dropper.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

FIG. 1 shows an apparatus according to an embodiment of the present invention.

A light source 1 is housed within the top portion 2 of an apparatus 3. The top portion 2 of the apparatus 3 is, in one embodiment, sealably connected 4 to a dropper portion or tube 5 of the apparatus 3. A power source 6 is incorporated within the apparatus 3 and provides power to a light source 1 optionally connected to a timer 7. The apparatus includes a switch 8 for turning on the light source 1, and the dropper portion 5 of the apparatus 3 may further include a coating or other markings 9 able to provide an indication of how much liquid is in the dropper.

A dropper is a necessity for any household containing infants and/or small children. This is because medicine for infants and small children is generally found in liquid form. Careful attention is required to insure that a proper dose of medicine is given to each child. Sick children frequently need to receive some medication at nighttime. One example of such a circumstance is the need to administer fever-reducing medicine to a child with a high temperature. It is difficult to administer the proper dosage at nighttime without turning on the lights and risking fully waking the sick child. If the sick child is fully woken, it becomes very difficult to coax the child back to sleep. Additionally, it is often difficult to locate the child's mouth in the dark, which can lead to spills of the medicine in the dropper if the medicine is not dispensed directly into the mouth. The invention, a dropper for use in nighttime or other lowlight conditions, solves the problem of administering the safe and correct dose of medicine without fully waking the sick child. One means of implementing the invention is to have a dropper containing a small LED light source in the top portion of the dropper. The LED light can be activated by depressing the bulb at the top of the dropper. The LED light will thereby be illuminated for a set period of time, e.g. one minute, which will allow the adult administering the dose of medicine to confirm that the proper amount of liquid is in the dropper. The illuminated dropper will also allow the adult to locate the child's mouth easily and administer the medicine with a minimum of fuss and spills. The dropper would contain a long-lasting battery source to power the activation of the LED light.

As mentioned above, another embodiment of the present invention is directed to a dropper with one or more of the following attributes: able to take in and dispense liquids by drops, containing a bulb for manual control of the intake and dispensing of liquids by drops, able to provide an indication of how much liquid is in the dropper, having a coating that illuminates in night or other low-light conditions so that the amount of liquid in the dropper is visible, and built to meet applicable industry standards.

In other embodiments, the dropper may have one or more of the following attributes:

Be simple, cost effective and disposable.

Dropper may have notches on the tube filled in with luminescent material.

Be capable of indoor or outdoor application.

Have solar panels for powering the LED light.

While a number of embodiments of the present invention have been described, it is understood that these embodiments are illustrative only, and not restrictive, and that many modifications may become apparent to those of ordinary skill in the art.

The invention claimed is:

1. A dropper comprising:
   a) a tube configured to intake and disperse liquids;
   b) a top portion including a bulb, sealably connected to the tube, for manual control of the intake and dispensing of the liquids;
   c) a light source wholly incorporated within the bulb;
   d) a power source for powering the light source; and
   e) a switch incorporated within the top portion of the dropper for activating the light source and illuminating the tube.

2. A method for intaking and dispensing liquids using a dropper comprising:

a) intaking liquid into a tube, which is sealably connected to a top portion including a bulb, by squeezing and releasing the top portion;
b) activating a light source wholly incorporated within the top portion using a switch mechanism and illuminating the tube;
c) confirming that a desired amount of liquid is present in the tube; and
d) dispensing the liquid by squeezing the top portion of the dropper.

* * * * *